United States Patent
Sethumadhavan et al.

(10) Patent No.: US 11,449,197 B2
(45) Date of Patent: Sep. 20, 2022

(54) AGENT CONSOLE FOR FACILITATING CHAT INTERACTIONS WITH CUSTOMERS

(71) Applicant: [24]7.ai, Inc., San Jose, CA (US)

(72) Inventors: Subha Sethumadhavan, Bangalore (IN); Bhanu Anupama Atmuri, Bangalore (IN); Veda Rajapandian, Bangalore (IN); Ajay Sreedhar, Bangalore (IN)

(73) Assignee: [24]7.ai, Inc., Campbell, CA (US)

( * ) Notice: Subject to any disclaimer, the term of this patent is extended or adjusted under 35 U.S.C. 154(b) by 0 days.

(21) Appl. No.: 16/812,573

(22) Filed: Mar. 9, 2020

(65) Prior Publication Data

US 2022/0155915 A1    May 19, 2022

Related U.S. Application Data (60) Provisional application No. 62/815,658, filed on Mar. 8, 2019.

(51) Int. Cl.
*G06F 3/0482* (2013.01)
*H04L 51/046* (2022.01)
*G06Q 30/00* (2012.01)

(52) U.S. Cl.
CPC ......... *G06F 3/0482* (2013.01); *G06Q 30/016* (2013.01); *H04L 51/046* (2013.01); *G06F 2203/04803* (2013.01)

(58) Field of Classification Search
CPC .... G06F 3/0482; G06Q 30/016; H04L 51/046
See application file for complete search history.

(56) References Cited

U.S. PATENT DOCUMENTS

| | | | | |
|---|---|---|---|---|
| 8,000,973 | B2* | 8/2011 | Williams | G10L 13/027 704/275 |
| 8,666,929 | B2* | 3/2014 | Jaffer | H04M 3/5191 706/62 |
| 8,904,409 | B2* | 12/2014 | Jaffer | G06Q 30/016 705/7.42 |
| 9,786,011 | B1* | 10/2017 | Engelhorn | G06V 10/751 |
| 2013/0013663 | A1* | 1/2013 | Jaffer | G06Q 10/06398 709/202 |
| 2015/0382047 | A1* | 12/2015 | Van Os | H04N 21/4394 725/38 |
| 2016/0294952 | A1* | 10/2016 | Bodell | H04L 67/146 |
| 2016/0295018 | A1* | 10/2016 | Loftus | H04M 3/5166 |
| 2016/0358240 | A1* | 12/2016 | Redfern | G06Q 30/0619 |
| 2017/0103346 | A1* | 4/2017 | Bodell | G06Q 30/016 |

(Continued)

*Primary Examiner* — Anil K Bhargava
(74) *Attorney, Agent, or Firm* — Perkins Coie LLP; Michael Glenn (57) ABSTRACT

A chat console includes a chat portion and at least one portion corresponding to an enterprise system application. The chat portion displays text related to a chat interaction between the agent and a customer in real-time in an ongoing manner. The portion related to the enterprise system application displays data relevant to the chat interaction fetched from a respective enterprise system application. The agent console operatively communicates with three enterprise system applications, such that data relevant to the current chat interaction is fetched from each of the three enterprise system applications and displayed in a respective portion within the agent console.

18 Claims, 6 Drawing Sheets

(56) References Cited

U.S. PATENT DOCUMENTS

| | | |
|---|---|---|
| 2017/0140449 A1* | 5/2017 | Kannan ................ G06Q 30/016 |
| 2017/0214799 A1* | 7/2017 | Perez ..................... G06F 16/35 |
| 2017/0277993 A1* | 9/2017 | Beaver ............... G06Q 30/0201 |
| 2018/0054523 A1* | 2/2018 | Zhang .................... G06F 40/35 |
| 2019/0220154 A1* | 7/2019 | Muramoto .......... G06F 3/04886 |
| 2019/0265865 A1* | 8/2019 | Yaseen ................ G06Q 30/016 |
| 2022/0103493 A1* | 3/2022 | Barak ............... H04M 1/72436 |

* cited by examiner

FIG. 5

AGENT CONSOLE FOR FACILITATING CHAT INTERACTIONS WITH CUSTOMERS

CROSS REFERENCE TO RELATED APPLICATION

This application claims the benefit of U.S. Provisional Application No. 62/815,658 filed Mar. 8, 2019, the contents of which are herein incorporated by reference.

TECHNICAL FIELD

The present technology generally relates to solutions facilitating interactions between agents and customers of an enterprise, and more particularly to agent consoles capable of facilitating chat interactions between the agents and the customers of the enterprise.

BACKGROUND

Most enterprises, nowadays, deploy both live and automated conversational agents to interact with existing and potential customers of the enterprises and provide them with desired assistance. The customers may initiate interactions with the conversational agents for a variety of reasons. For example, a customer may initiate a voice interaction with a conversational agent to troubleshoot a problem, to enquire about product or service of interest, to make a payment or to lodge a complaint, etc.

In some example scenarios, the conversational agents may also initiate interactions with the customers. For example, a conversational agent may initiate an interaction with a customer to offer assistance during a customer journey on an enterprise interaction channel, to provide recommendations on potential purchases, to offer promotional schemes or discount coupons on latest enterprise offerings, and the like.

One example of a conversational agent is a human chat agent, who is trained to chat with visitors (i.e. potential or existing customers) browsing an enterprise Website and provide the visitors with desired assistance. Typically, the electronic devices of the chat agents are equipped with a chat application capable of displaying a chat console to the respective agents. The chat consoles enable the respective agents to engage in chat interactions with the customers. In addition to the chat application, each agent may also be provided with access to several other tools/applications to support the agent during the chat interaction. In an illustrative example, a customer may seek a clarification on a high value transaction item in a monthly bill. In such a scenario, the agent may switch from the chat console to a billing application associated with the enterprise to fetch the desired information for the customer. In another illustrative example, the customer may request a status of a complaint submitted on an enterprise Web portal. In response to the customer request, the agent may switch from the chat console to access a ticketing application associated with the enterprise and provide the status of the complaint to the customer. Accordingly, the agent may be provided with access to applications, like the billing application, the ticketing application, and the like, to enable the agent to handle customer queries.

Generally, the agent has to switch back and forth between the chat console and other enterprise system applications several times, which is inefficient and can lead to agent frustration. The customer involved in the chat interaction with the agent may also have to wait each time the agent has to retrieve information from another tool/application and this may ruin a quality of an interaction experience afforded to the customer. Moreover, in some scenarios, the agent may fetch incorrect information on account of having to switch between multiple interfaces leading to wastage of time and effort on part of the agent.

Accordingly, there is a need to enable the agent to conduct chat interactions with customers of the enterprise while precluding long waiting times for fetching information from enterprise system applications. There is also a need to facilitate chat interactions while reducing, if not completely avoiding, back and forth switching between the agent's chat console and the enterprise system applications.

DESCRIPTION OF THE DRAWINGS

The advantages and features of the present technology will become better understood with reference to the detailed description taken in conjunction with the accompanying drawings, wherein like elements are identified with like symbols, and in which.

The drawings referred to in this description are not to be understood as being drawn to scale except if specifically noted, and such drawings are only exemplary in nature.

DESCRIPTION OF THE TECHNOLOGY

The best and other modes for carrying out the present invention are presented in terms of the embodiments, herein depicted in FIGS. 1 to 5. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

Overview

Most enterprises, nowadays, deploy dedicated personnel to assist their customers. Such personnel are referred to herein as customer service representatives, customer support representatives or simply as 'agents' of the enterprise. The agents may engage with the customers using several interaction mediums, such as for example a voice medium, a chat medium, a social interaction medium, and the like. Human agents engaged in providing chat-based support typically use a chat console for engaging in chat interactions with the customers. The chat agents are also provided with access to several enterprise system applications for enabling the agents to fetch information required to provide the desired assistance to the customers. Some non-exhaustive examples of such enterprise system applications may include a customer relationship management (CRM) application to check for customer records, a billing application to check for recent transactions, an ordering application to check the status of customer orders, and the like. Typically, the agent has to switch back and forth between the chat console and the enterprise system applications several times, which is inefficient and can lead to agent frustration. The customer involved in the chat interaction with the agent may also have to wait each time the agent has to retrieve information from an enterprise system application and, this may ruin a quality of an interaction experience afforded to the customer.

Accordingly, an improved chat console, hereinafter referred to as an 'agent console' is disclosed. The agent console is capable of assuming a first form and a second form, and also of toggling between the first form and the second form as needed, such that the agent console is always available to the agent. As the agent console is always available to the agent, in some embodiments, the agent console is also referred to as a 'companion console'.

In one embodiment, the first form of the agent console corresponds to a full-fledged chat console. More specifically, the agent console in the first form includes a chat portion and at least one more portion corresponding to an enterprise system application. The chat portion is capable of displaying text related to a chat interaction between the agent and a customer in real-time in an ongoing manner. The at least one portion related to the enterprise system application may be configured to display data relevant to the chat interaction fetched from a respective enterprise system application. In an illustrative example, the agent console may operatively communicate with three enterprise system applications, such that data relevant to the current chat interaction is fetched from each of the three enterprise system applications and displayed in a respective portion within the agent console. As the information is readily available to the agent, the customer does not have to endure a waiting time for the agent to fetch the desired information. Moreover, the frequent switching to other applications from the agent console is also avoided as relevant information from the enterprise system applications is available within the agent console itself.

In some cases, however, number of enterprise system applications, from which the data may have to be fetched may be more and as such, the integration of all the enterprise system applications within the agent console may not be possible. Moreover, in some cases, it may not be possible to integrate an enterprise system application within the agent console because of lack of operable compatibility. In all such cases, the agent may have to toggle from the agent console to the enterprise system application to fetch the desired information. The agent console, as disclosed herein, is capable of detecting an agent input indicative of the agent seeking access to an enterprise system application not integrated within the agent console. In response to detection of the agent input, the agent console may be configured to assume a second form, such as for example, a widget form, and hover over the non-integrated enterprise system application, such that the chat portion within the agent console is still available to the agent for continuing the chat interaction with the customer. Thus, the agent console is configured to be displayed to the agent all the time, and even when the agent toggles to another enterprise system application, the agent console continues to remain manifesting itself as a widget. This creates a seamless and instant connect with an agent and a customer. Since the chat console stays with the agent forever, it serves as a companion to the human chat agent at all points of the interactions with the customers.

As the agent console is capable of toggling between the first form and the second form, the back and forth switching is substantially reduced, thereby greatly improving an experience for the human chat agent. The agent console is further explained in detail with reference to FIGS. 1 to 5 hereinafter.

Figure 1:
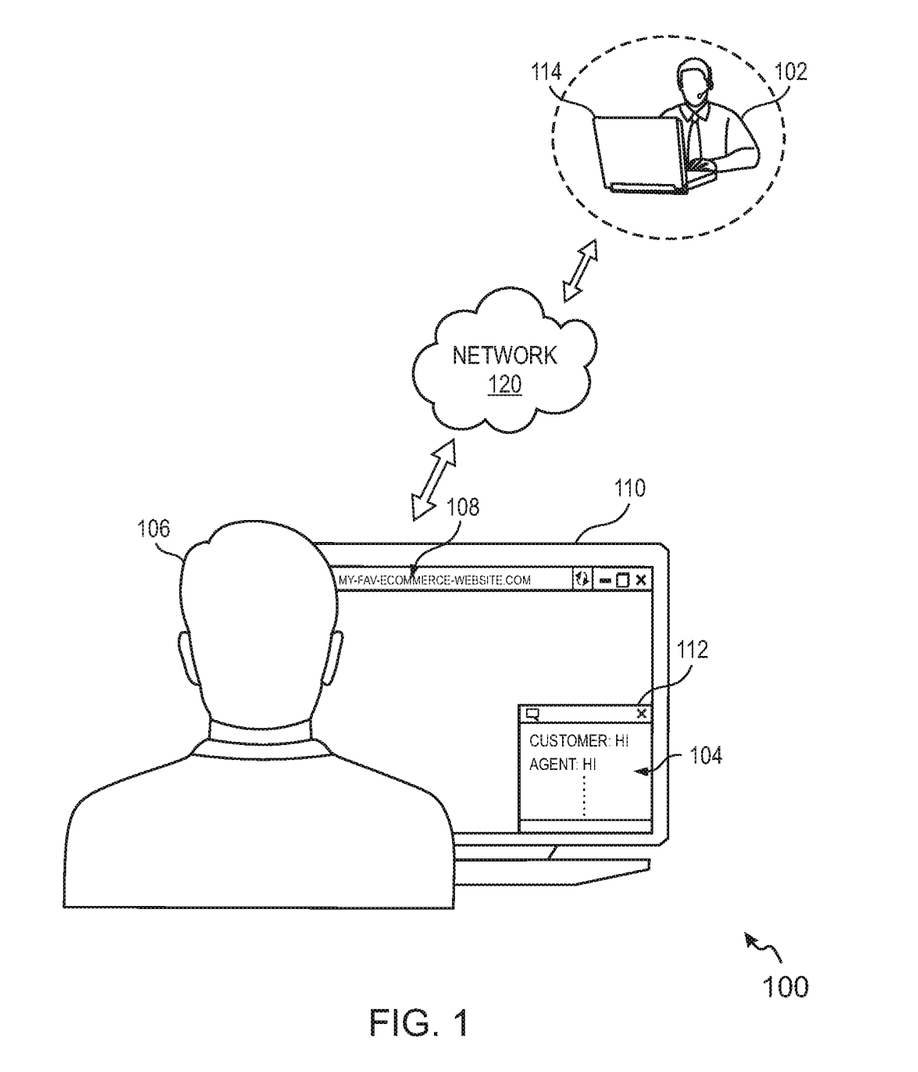
FIG. 1 is a representation showing a human chat agent engaged in a chat interaction with a customer of an enterprise, in accordance with an example embodiment.

FIG. 1 is a representation 100 showing a human chat agent 102 engaged in a chat interaction 104 with a customer 106 of an enterprise, in accordance with an example embodiment. The term 'enterprise' as used herein may relate to any private or public entity offering products, services and/or information to consumers of such offerings. For example, the enterprise may be a retail enterprise, a banking enterprise, a news channel, an educational institution, a financial trading enterprise, an aviation company, a consumer goods business, and the like. Most enterprises, nowadays, deploy personnel dedicated to providing assistance to the customers. Such personnel are referred to herein as 'conversational agents'. One such example conversational agent is shown as human chat agent 102 in FIG. 1. The human chat agent 102 is hereinafter referred to as agent 102.

The customer 106 is shown to be accessing an enterprise Website 108 using an electronic device 110 (exemplarily depicted to be a desktop computer). It is noted that the Website 108 is depicted to be devoid of content for illustration purposes and that the Website 108 may display content related to enterprise offerings, promotional schemes, new launches, and the like. Further, the Website 108 may display a widget or a pop-up (not shown in FIG. 1), which is associated with text such as 'Let's Chat' or 'Need Assistance, Click Here!'. The customer 106 may click on the widget or the pop-up to seek assistance. It is noted the customer 106 may seek assistance from an agent, such as the agent 102 for a variety of reasons, such as to troubleshoot a problem, to enquire about a product or a service of interest, to make a payment, to lodge a complaint, and the like.

Upon receiving an input corresponding to the widget or the pop-up, a Web server hosting the Web site 108 may be configured to cause display of a chat console such as a chat console 112 on the display screen of the customer's electronic device 110. The chat console is hereinafter referred to as a customer chat console 112. The customer 106 may use the customer chat console 112 to engage in a textual chat conversation (i.e. the chat interaction 104) with the agent 102, for receiving desired assistance.

The agent 102 is also depicted to utilize an electronic device 114 (exemplarily depicted to be a laptop) for interacting with customers, such as the customer 106. The electronic devices 110 and 114 are configured to connect to a communication network, such as a network 120, for facilitating the chat interaction between the customer 106 and the agent 102. Examples of the network 120 may include wired networks, wireless networks or a combination thereof. Some non-exhaustive examples of the wired networks may include Ethernet, local area network (LAN), fiber-optic cable network, and the like. Some non-exhaustive examples of the wireless networks may include cellular networks like GSM/3G/4G/5G/CDMA networks, wireless LAN, Blue-tooth or ZigBee networks, and the like. An example of a combination of wired and wireless networks may include the Internet.

In at least one example embodiment, the electronic device 114 is configured to display a chat console, referred to herein as an agent console, for enabling the agent 102 to engage in the chat interaction 104 with the customer 106. The agent console is capable of manifesting in a first form or a second form for facilitating the chat interaction 104 with the customer 106. In at least one embodiment, a system is configured to cause display of such agent consoles on the electronic devices of the agents to facilitate agent chat interactions with the customers. The system for facilitating chat interactions with the customers is explained next with reference to FIG. 2.

Figure 2:
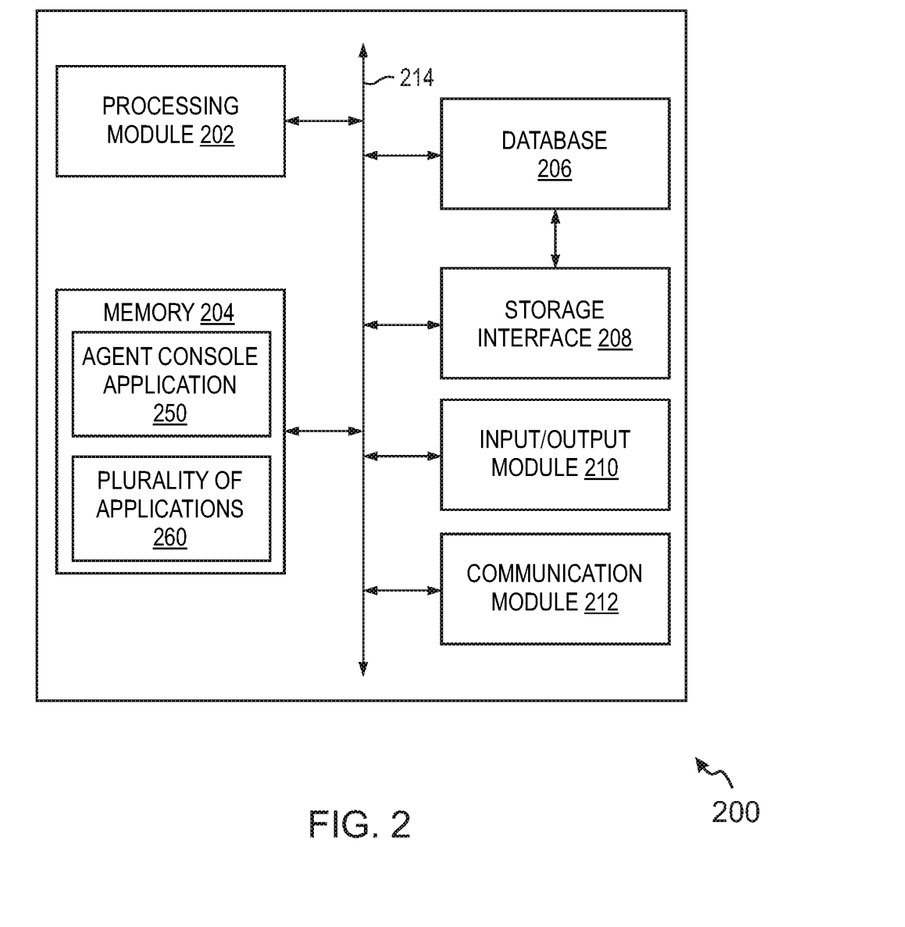
FIG. 2 is a block diagram of a system configured to facilitate chat interactions between agents and a plurality of customers of the enterprise, in accordance with an example embodiment.

FIG. 2 is a block diagram of a system 200 configured to facilitate chat interactions between the agents (such as the agent 102 shown in FIG. 1) and a plurality of customers of the enterprise, in accordance with an example embodiment.

In one embodiment, the system 200 may be implemented as an interaction platform including a set of software layers on top of existing hardware systems. In another embodiment, the system 200 may be implemented completely as a platform including a mix of existing open systems, proprietary systems and third-party systems.

In one embodiment, the system 200 is included within an enterprise server. The enterprise server may be deployed either at an enterprise site, at a site associated with a customer service center, on the cloud or at any other remote location. The electronic devices associated with the agents may be configured to access the enterprise server using a wired connection (for example, a LAN connection), a wireless connection (for example, a WLAN connection) or a combination of wired and wireless connections (for example, the Internet).

The system 200 includes a processing module 202, a memory 204, a database 206, a storage interface 208, an input/output (I/O) module 210 and a communication module 212. It is noted that although the system 200 is depicted to include the processing module 202, the memory 204, the database 206, the storage interface 208, the input/output (I/O) module 210 and the communication module 212, in some embodiments, the system 200 may include more or fewer components than those depicted herein. More specifically, the system 200 may be implemented as a centralized system, or, alternatively, the various components of the system 200 may be deployed in a distributed manner while being operatively coupled to each other. For example, in at least some embodiments, the database 206 may not be a part of the system 200 but instead be deployed as a data store in an external environment, such as in a remote Web server or in cloud storage and may be in operable communication with the system 200. In an embodiment, one or more functionalities of the system 200 may also be embodied as a client within electronic devices, such as agents' electronic devices. In another embodiment, the system 200 may be a central system that is shared by or accessible to each of such devices.

The processing module 202 may be embodied as a multi-core processor, a single core processor, or a combination of one or more multi-core processors and one or more single core processors. For example, the processing module 202 may be embodied as one or more of various processing devices, such as a coprocessor, a microprocessor, a controller, a digital signal processor, a processing circuitry with or without an accompanying digital signal processor, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 202 may be configured to execute hard-coded functionality. In an embodiment, the processing module 202 is embodied as an executor of software instructions, wherein the instructions may specifically configure the processing module 202 to perform the algorithms and/or operations described herein when the instructions are executed.

In an embodiment, the memory 204 is capable of storing machine executable instructions, referred to herein as platform instructions. The processing module 202 may be configured to execute the platform instructions. The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semi-conductor memories (such as mask ROM, PROM (programmable ROM), EPROM (erasable PROM), flash memory, RAM (random access memory), etc.).

In at least one example embodiment, the memory 204 stores an agent console application 250 and a plurality of applications 260. The plurality of applications 260 may include a chat application and other enterprise system applications, such as a Customer Relationship Management (CRM) application, an ordering application, a billing application, a ticketing application, and the like. The processing module 202 may execute instructions related to the agent console application 250 stored in the memory to cause display of an agent console on respective electronic devices of the agents as will be explained in further detail later.

The database 206 is any computer-operated hardware suitable for storing data related to the customers of the enterprise. For example, the database 206 may include a CRM database capable of storing information related to each customer such as the customer's name, customer's contact information, the type of electronic devices associated with the customer, recent customer purchase transaction, recent journey information on the enterprise interaction channels, and the like. The CRM application stored in the memory 204 may be configured to fetch information for customers engaged in chat interactions from the CRM database stored in the database 206. Similarly, the database 206 may include a billing database, a ticketing database, and the like, and the corresponding applications in the memory 204 may be configured to fetch customer information from the respective databases in the database 206.

The database 206 may include multiple storage units such as hard disks and/or solid-state disks in a redundant array of inexpensive disks (RAID) configuration. The database 206 may include a storage area network (SAN) and/or a network attached storage (NAS) system. The storage interface 208 is any component capable of providing the processing module 202 with access to the database 206. The storage interface 208 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing module 202 with access to the database 206.

In an embodiment, the I/O module 210 includes mechanisms configured to receive inputs from and provide outputs to the users of the system 200. The term 'users of the system 200' as used herein may include an agent of the enterprise (such as the agent 102 shown in FIG. 1), an IT manager of the enterprise, a local system administrator, and the like. To enable reception of inputs and provide outputs to the user of the system 200, the I/O module 210 may include at least one input interface and/or at least one output interface. Examples of the input interface may include, but are not limited to, a keyboard, a mouse, a joystick, a keypad, a touch screen, soft keys, a microphone, and the like. In at least one embodiment, the user of the system 200, such as the agent may use the input interface to access the agent console application 250 and customize the agent console for respective need. For example, the agent may specify one or more enterprise system applications that the agent typically uses. In an illustrative example, the agent may specialize in resolving customer's billing related concerns. In such a scenario, the agent may require access to enterprise system applications like the CRM application, the billing application, the ticketing application, frequently. Accordingly, the agent may specify such applications using the I/O module 210 to customize the agent console.

Examples of the output interface of the I/O module 210 may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, at least one module of the system 200 may include I/O circuitry configured to control at least some functions of one or more elements of the I/O module 210, such as, for example, a speaker, a microphone, a display, and/or the like. The module of the system 200 and/or the I/O circuitry may be configured to control one or more functions of the one or more elements of the I/O module 210 through computer program instructions, for example, software and/or firmware, stored on a memory, for example, the memory 204, and/or the like, accessible to the processing module 202 of the system 200.

The communication module 212 is configured to facilitate communication between the system 200 and one or more remote entities over a communication network. For example, the communication module 212 is capable of facilitating agent access to the system 200. The agents, as explained above, may access the system 200 to utilize the agent console for engaging in chat interactions with the customers. In some embodiments, the agents may access the system 200 using the communication module 212 and download an instance of the agent console application 250 onto their respective electronic devices.

In an embodiment, various components of the system 200, such as the processing module 202, the memory 204, the database 206, the storage interface 208, the I/O module 210 and the communication module 212 are configured to communicate with each other via or through a centralized circuit system 214. The centralized circuit system 214 may be various devices configured to, among other things, provide or enable communication between the components (202-212) of the system 200. In certain embodiments, the centralized circuit system 214 may be a central printed circuit board (PCB) such as a motherboard, a main board, a system board, or a logic board. The centralized circuit system 214 may also, or alternatively, include other printed circuit assemblies (PCAs) or communication channel media.

In at least some embodiments, the agent console application 250 is configured to generate an agent console capable of assuming a first form and a second form and toggling between the first form and the second form to facilitate agent chat interaction with customers. Further, the agent console is configured to include a plurality of portions. A portion within the agent console corresponds to a chat portion, which is configured to display a chat interaction panel showing a chat conversation between the agent and a customer in real-time. Further, each remaining portion within the agent console is associated with an enterprise system application. More specifically, the agent console application 250 is configured to integrate several enterprise system applications within the agent console. For example, the agent console application 250 may be configured to integrate a CRM application, a billing application, an ordering application, a ticketing application, and the like. Each of the integrated enterprise system applications may be associated with a portion with the agent console. For example, one portion within the agent console may be configured to display customer information fetched from the CRM database. In another illustrative example, one portion within the agent console may be configured to display information related to the customer fetched from the ordering database. Accordingly, the agent console generated by the system 200 may include plurality of portions corresponding to a plurality of enterprise system applications.

As explained above, the electronic devices associated with the agents may be configured to access the agent console application 250 stored in the system 200. In some embodiments, instances of the agent console application 250 may be downloaded from the enterprise server, i.e. from the system 200, as a client onto the respective electronic devices. The agents may thereafter install the downloaded client of the agent console application 250 onto their respective electronic devices. The downloaded client may be in operable communication with the agent console application 250 stored in the system 200.

The agent console application 250, when accessed by the agent, may be configured to cause display of a first form of an agent console. A simplified representation of the first form of the agent console is shown in FIG. 3A.

Figure 3A:
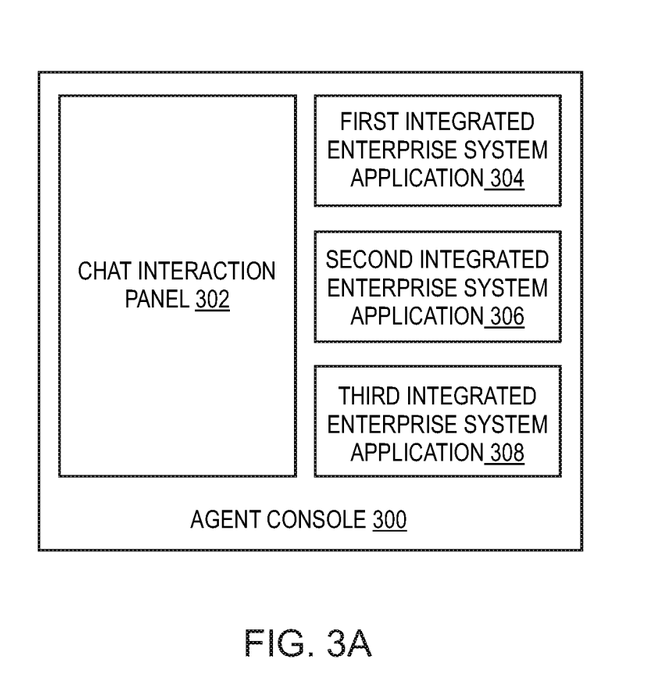
FIG. 3A shows a simplified representation of a first form of an agent console, in accordance with an example embodiment.

FIG. 3A shows a simplified representation of a first form of the agent console 300, in accordance with an example embodiment. As explained with reference to FIG. 2, an agent may access the agent console application 250 either from the system 200 in the enterprise server or download a client of the agent console application 250, which is in operable communication with the system 200. The agent console application 250, after access, displays a first form of the agent console 300 as shown in FIG. 3A.

The first form of the agent console 300 corresponds to a full-fledged chat console. More specifically, the agent console 300 in the first form includes a portion capable of displaying a chat interaction panel 302 (hereinafter referred to as chat portion 302) and a plurality of other portions associated with integrated enterprise system applications. For example, the first form includes portions related to a first integrated enterprise system application 304 (hereinafter referred to as portion 304), a second integrated enterprise system application 306 (hereinafter referred to as portion 306) and a third integrated enterprise system application 308 (hereinafter referred to as portion 308). The chat portion 302 is capable of displaying text related to a chat interaction (such as the chat interaction 104 shown in FIG. 1) between the agent and a customer in real-time in an ongoing manner. The portions 304, 306 and 308 are configured to display information relevant to the chat interaction fetched from the respective enterprise system applications. As an illustrative example, some enterprise system applications, such as CRM application or an ordering application, which are routinely accessed by the agent to handle customer queries, may provide exposed Application Programming Interfaces (APIs). In such a case, the agent console application 250 is configured to use the exposed APIs to integrate such applications within the agent console 300 and the integrated enterprise system applications may be displayed as enterprise widgets as represented by portions 304, 306 and 308. In some embodiments, an enterprise system application from which data is routinely fetched by the agent may not provide exposed APIs but instead may enable integration as a Web view within the agent console 300. In such a case, a portion from among the portions 304, 306 and 308 may be configured as a Web view for displaying information fetched from the corresponding enterprise system application. It is noted that three portions corresponding to three integrated enterprise system applications are shown herein for illustration purposes and the number of portions in addition to the chat portion 302 may vary depending upon system requirements as well as customization by the agent/system administrator.

The portions 304, 306 and 308 of the agent console 300 may be configured to be dynamically populated with information from the respective enterprise system application as the interaction between the agent and the customer is initiated. In some embodiments, the agent console application 250 may be configured to communicate for example, by using API calls or using a sequence of request-receive commands, with the enterprise system applications to retrieve information related to the chat interaction and thereafter include the retrieved information in the respective portions within the agent console 300. For example, one portion within the agent console 300, which is associated with the CRM application, may be configured to display customer information fetched from a CRM database. In another illustrative example, one portion within the agent console 300, which is associated with the billing application, may be configured to display information related to the customer fetched from a billing database and so on and so forth.

In an illustrative example, an agent specialized in interacting with customers of a telecom enterprise may require access to four enterprise system applications to handle the customer queries. For example, these enterprise system applications may correspond to a CRM application, a ticketing application, an ordering application and a billing application. In at least one example embodiment, the enterprise system applications which are associated with exposed APIs are integrated within the agent console 300, itself. For example, out of the four systems, two enterprise systems may have APIs exposed and can be integrated into the agent console 300 and can be shown as enterprise widgets as represented by portions, say portion 304 and 306. Further, an enterprise system application capable of being exposed as Web view may be associated with the portion 308 within the agent console 300. The fourth enterprise system application may not be capable of being integrated within the agent console 300 and the agent may have to toggle from the agent console 300 to the fourth enterprise system application to fetch the desired information. In at least one example embodiment, the agent console application 250, which is causing the display of the agent console 300, is capable of detecting an agent input indicative of the agent seeking access to an enterprise system application not integrated with the agent console 300. In response to detection of such an input, the agent console application 250 may be configured to cause toggling of the agent console 300 to assume a second form, such as for example, a widget form, and hover over a UI associated with the non-integrated fourth enterprise system application, such that the chat portion 302 within the agent console 300 is still available to the agent for continuing the chat interaction with the customer. The second form, for example a widget form, of the agent console 300 is depicted in FIG. 3B.

Figure 3B:
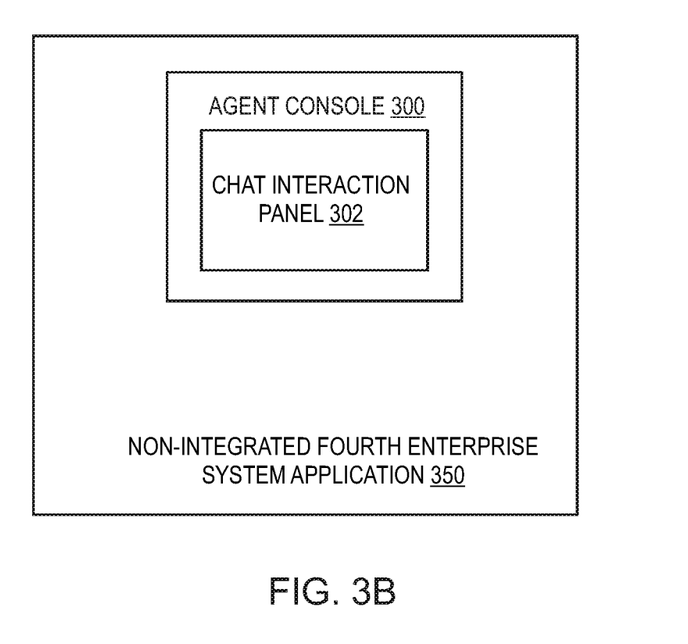
FIG. 3B shows a simplified representation of a second form of the agent console of FIG. 3A, in accordance with an example embodiment.

Referring now to FIG. 3B, a simplified representation of a second form of the agent console 300 is shown, in accordance with an example embodiment. As explained with reference to FIG. 3A, the agent console application 250 upon access is configured to display the first form, i.e. a full-fledged chat console form, of the agent console 300. The agent console 300 includes the chat portion 302 and the portions 304, 306 and 308 related to integrated enterprise system applications. The agent input indicative of seeking access to a non-integrated enterprise system application causes the agent console application 250 to toggle a form of the agent console 300 to a widgetized form, such as the widget form of the agent console 300 depicted in FIG. 3B. The widgetized form of the agent console 300 is configured to display only the chat portion 302. The widgetized form of the agent console 300 is depicted to be displayed on a portion of a UI 350 associated with non-integrated fourth enterprise system application (i.e. the fourth enterprise system application). The agent may then fetch the desired information while continuing to interact with the customer. Thus, the agent console 300 is configured to be displayed to the agent all the time, and even when the agent toggles to another enterprise system application, the agent console 300 continues to remain manifesting itself as a widget. Moreover, as the agent console 300 is capable of toggling between the first form and the second form, the back and forth switching is substantially reduced, thereby greatly improving an experience for the human chat agent. An average handle time (AHT) for the agent is also reduced.

Figure 4A:
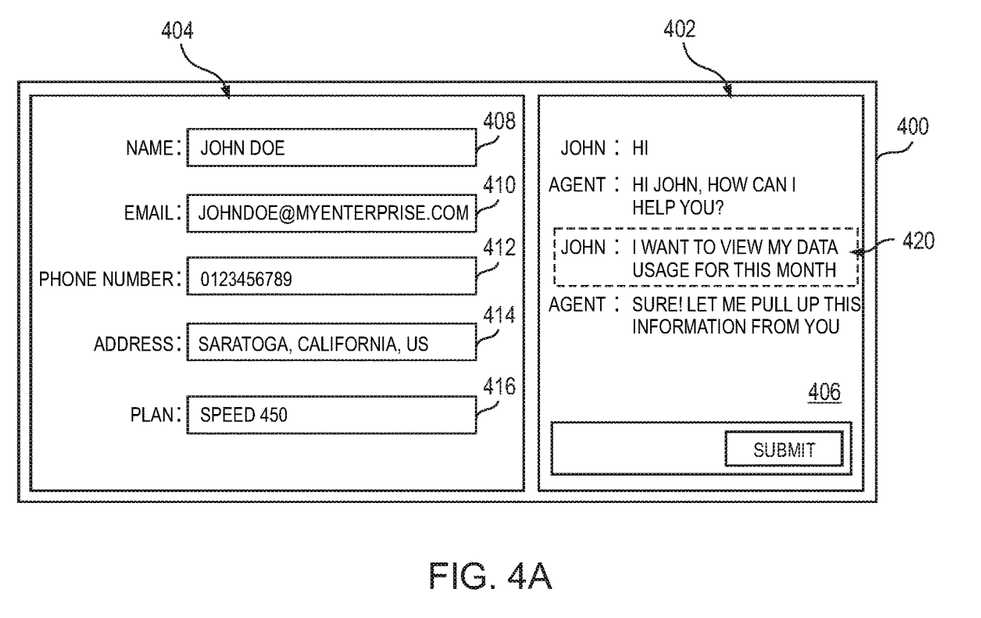
FIG. 4A shows a representation of an agent console for illustrating an example toggling of an agent console from a first form to a second form, in accordance with an example embodiment.

FIG. 4A shows a representation of the agent console 400 for illustrating an example toggling of an agent console 400 from a first form to a second form, in accordance with an example embodiment. A full-fledged chat console, i.e. a first form, of the agent console 400 is depicted in FIG. 4A. The agent console 400 is exemplarily depicted to include a chat portion 402 and a portion 404 displaying CRM information related to a customer currently engaged in a chat interaction with the agent. As explained with reference to FIGS. 2 and 3A, the agent console application 250 is configured to generate an agent console including a chat portion and one or more portions, which correspond to enterprise system applications capable of being integrated with the chat application. In FIG. 4A, only one portion, i.e. the portion 404 corresponding to a CRM application is depicted to be included within the agent console 400 for illustration purposes. The portion 404 corresponding to the CRM application is referred to hereinafter as the CRM portion 404. As explained with reference to FIG. 3A, an agent console may include one or more portions corresponding to enterprise system applications capable of being integrated with the chat application.

The chat portion 402 is depicted to display an ongoing chat interaction 406 between the agent and a customer 'John'. The CRM portion 404 is depicted to display information related to the customer. More specifically, the CRM portion 404 is depicted to include a plurality of form fields, such as form fields 408, 410, 412, 414 and 416. The form fields 408, 410, 412, 414, 416 and 418 are depicted to have been populated with information related to the customer 'John' fetched from a CRM database, using the CRM application. Accordingly, the form fields 408, 410, 412, 414 and 416 are depicted to display a customer's name (i.e. 'JOHN DOE'), a customer email ID (i.e. 'JOHNDOE@MYENTERPRISE.COM'), a customer phone number (i.e. '0123456789'), a customer address (i.e. 'SARATOGA, CALIF., US') and a customer plan (i.e. 'SPEED 850'), respectively. It is noted that these form fields in the CRM portion 404 are depicted for illustration purposes, and that the CRM portion 404 may include more or less or different form fields than those depicted in FIG. 4A.

The ongoing chat interaction 406 displayed in the chat portion 402 is depicted to include a plurality of lines. The conversational lines associated with the customer 'John' are exemplarily depicted to be associated with label 'JOHN', and the conversational lines associated with the agent are depicted to be associated with label 'AGENT'. In the chat interaction 406, the customer 'John' is depicted to have requested details related to data usage for the current phone bill at 420. In an example scenario, the billing application associated with the enterprise may not be capable of being integrated within the agent console 400 and in such a scenario, the agent may have to toggle to the billing application from the agent console 400. Accordingly, the agent may click on the billing application (for example, on an icon in the taskbar being displayed on the agent's electronic device) to toggle from the agent console 400 to the billing application. As explained with reference to FIGS. 2 to 3B, the agent console application 250 may be configured to detect an agent input indicative of the agent seeking access to a non-integrated enterprise system application and may toggle the form of the agent console 400 to a second form. The second form of the agent console 400 is depicted in FIG. 4B.

Figure 4B:
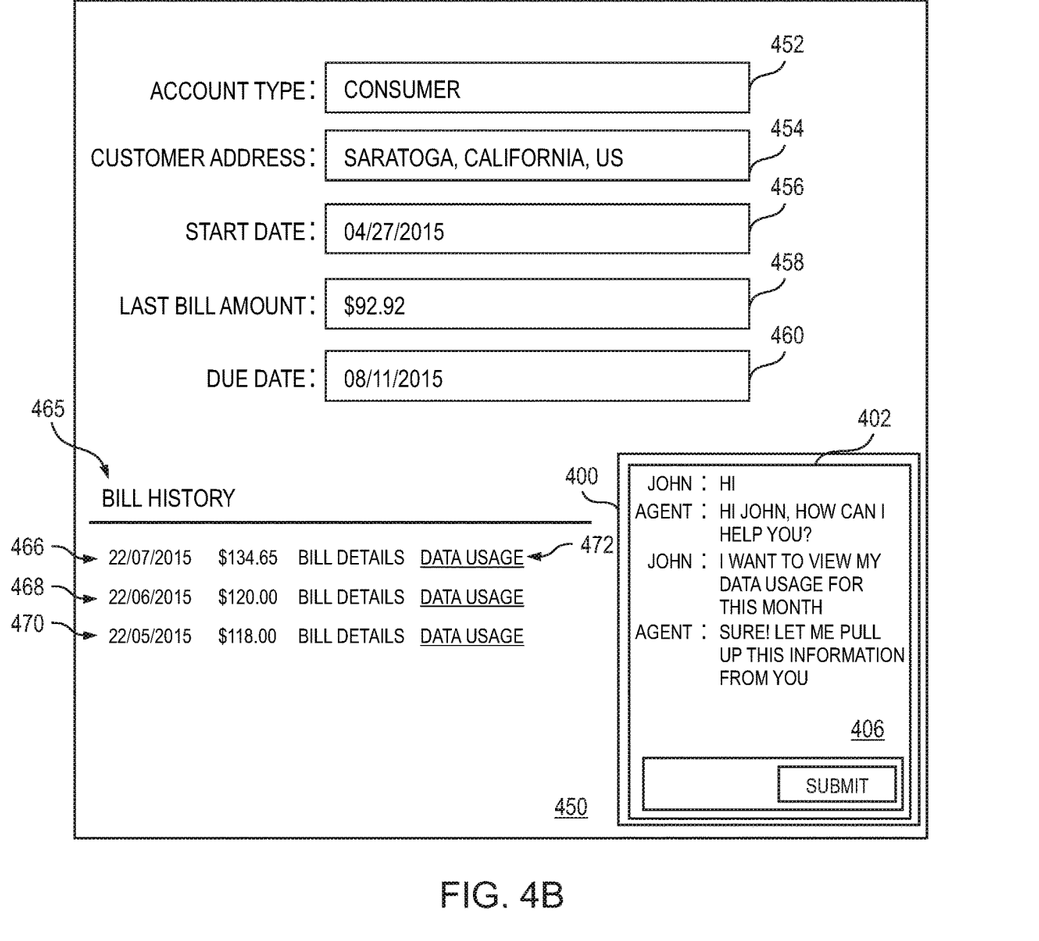
FIG. 4B depicts a second form of the agent console of FIG. 4A displayed on a UI associated with a non-integrated billing application, in accordance with an example embodiment.

FIG. 4B depicts a second form of the agent console 400 displayed on a UI 450 associated with the non-integrated billing application, in accordance with an example embodiment. As explained with reference to FIG. 4A, in response to a request from the customer 'John' to get information about his billing usage, the agent may toggle from the agent console 400 to the billing application. Accordingly, FIG. 4B depicts a UI 450 associated with a billing application. The UI 450 is depicted to include a plurality of form fields, such as form fields 452, 454, 456, 458 and 460 including information related to the customer John's billing history. More specifically, the form fields 452, 454, 456, 458 and 460 are depicted to display information related to an account type (i.e. 'CONSUMER'), a customer address (i.e. 'SARATOGA, CALIF., US), a start date (i.e. 'Apr. 27, 2015'), last bill amount (i.e.'92.92$) and due date (i.e. 'Aug. 11, 2015'), respectively. The UI 450 further includes a section 465 titled 'BILL HISTORY' including a plurality of entries, such as entry 466, 468 and 470 related to bills generated in the past corresponding to the customer John. Each entry is associated with an option, such as the option 472, to view data usage for the corresponding bill.

In response to detecting the agent input to toggle to the billing application, the agent console application 250 may cause the agent console 400 to toggle to a second form, i.e. a widget form, as shown in FIG. 4B. Moreover, the agent console 400 is configured to include the chat portion 402, so as to enable the agent to continue the chat interaction 406 while fetching information related to the data usage (for example, by using the option 472). It is noted that toggling of the agent console 400 may not be limited to the simplified example mentioned herein. It is understood that the agent may need to access several enterprise system applications during the course of the chat interaction, and as such, integrating enterprise system application within the agent console as well as toggling the agent console to assume a form, such as the widget form, enables the agent to communicate effectively with the customer, thereby improving a quality of interaction experience afforded to the customer.

A method for facilitating a chat interaction between an agent and a customer of an enterprise is explained next with reference to FIG. 5.

Figure 5:
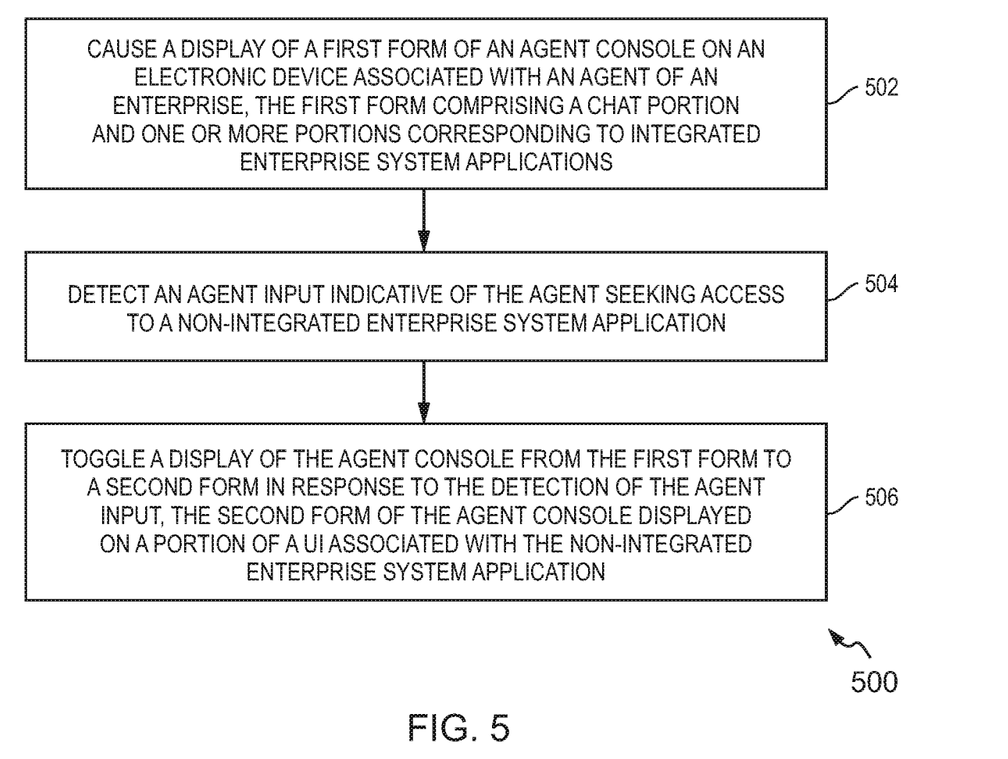
FIG. 5 shows a flow diagram of a method for facilitating a chat interaction between an agent and a customer of an enterprise, in accordance with an example embodiment.

FIG. 5 shows a flow diagram of a method 500 for facilitating a chat interaction between an agent and a customer of an enterprise, in accordance with an example embodiment. The various steps and/or operations of the flow diagram, and combinations of steps/operations in the flow diagram, may be implemented by, for example, hardware, firmware, a processor, circuitry and/or by a system such as the system 200 of FIG. 2 and/or by a different device associated with the execution of software that includes one or more computer program instructions (such as those related to the agent console application 250). The method 500 starts at operation 502.

At operation 502 of the method 500, a display of a first form of an agent console is caused on an electronic device associated with an agent of an enterprise. The first form including a chat portion and one or more portions corresponding to integrated enterprise system applications. The display of the first form is explained with reference to FIGS. 3A and 4A and is not explained again herein.

At operation 504 of the method 500, an agent input indicative of an agent seeking access to a non-integrated enterprise system application is detected.

At operation 506, a display of agent console is toggled from the first form to a second form in response to the detection of the agent input. The second form of the agent console is displayed on a portion of a UI associated with the non-integrated enterprise system application. The display of the second form is explained with reference to FIGS. 3B and 4B and is not explained again herein.

The method 500 ends at operation 506.

Various embodiments disclosed herein provide numerous advantages. The techniques disclosed herein suggest techniques for facilitating chat interactions between agents and customers of the enterprise. An agent console capable of following the agent's focus all the time is disclosed. The agent console is configured to be displayed to the agent all the time—even when the agent toggles to another application, the agent console continues to remain manifesting itself as a widget. This creates a seamless and instant connect with an agent and a customer. As the agent console is capable of toggling between the full-fledged chat console form and the widget form, the back and forth switching is substantially reduced, thereby greatly improving an experience for the human chat agent. The chat interactions with customers of the enterprise are conducted effectively while precluding long waiting times for fetching information from enterprise system applications, thereby improving a quality of the interaction experience afforded to the customers. An average handle time (AHT) for interactions is also reduced for the agents.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The exemplary embodiments were chosen and described in order to best explain the principles of the present technology and its practical application, to thereby enable others skilled in the art to best utilize the present technology and various embodiments with various modifications as are suited to the particular use contemplated.

The invention claimed is:

1. A method comprising:
   causing, by a computer system, an agent device to display a first form of an agent console,
      wherein the first form comprises a first chat portion and at least one application portion corresponding to at least one integrated enterprise system application;
   causing, by the computer system, the agent device to display text related to a chat interaction between the agent device and a customer device within the first chat portion;
   fetching, by the computer system, data related to the chat interaction from the at least one integrated enterprise system application;
   causing, by the computer system, the agent device to display the data fetched from the at least one integrated enterprise system application within the at least one application portion;
   detecting, by the computer system, an input from the agent device seeking access to at least one non-integrated enterprise system application;
   causing, by the computer system, the agent console, responsive to detecting the input from the agent device, to toggle from the first form to a second form,
      wherein the second form of the agent console comprises a second chat portion, and
      the second form of the agent console is a widget form that hovers over the at least one non-integrated enterprise system application, such that the second chat portion remains available on the agent device; and
   causing, by the computer system, the agent device to display the second form of the agent console simultaneously with the at least one non-integrated enterprise system application on the agent device.

2. The method of claim 1, wherein the input from the agent device is a first input, the method further comprising:
   detecting, by the computer system, a second input from the agent device seeking access to the at least one integrated enterprise system application.

3. The method of claim 2, further comprising:
   causing, by the computer system, the agent console, responsive to detecting the second input from the agent device, to toggle from the second form to the first form.

4. The method of claim 1, further comprising:
   integrating, by the computer system, the at least one integrated enterprise system application within the agent console using at least one exposed application programming interface (API).

5. The method of claim 1, further comprising:
   integrating, by the computer system, the at least one integrated enterprise system application within the agent console as a web view within the agent device.

6. The method of claim 1, wherein the at least one integrated enterprise system application comprises at least one of a ticketing application to check a status of customer complaints, a customer relationship management (CRM) application to check customer records, a billing application to check recent transactions, or an ordering application to check a status of customer orders.

7. The method of claim 1, wherein the at least one non-integrated enterprise system application comprises at least one of a ticketing application to check a status of customer complaints, a customer relationship management (CRM) application to check customer records, a billing application to check recent transactions, or an ordering application to check a status of customer orders.

8. The method of claim 1, wherein the at least one application portion is dynamically populated with the data fetched from the at least one integrated enterprise system application.

9. The method of claim 1, further comprising:
   reducing, by the computer system, an average handle time (AHT) for the chat interaction between the agent device and the customer device.

10. A system comprising:
    at least one computer processor; and
    a computer-readable non-transitory storage medium storing computer instructions that, when executed by the at least one computer processor, cause the at least one computer processor to:
       cause an agent device to display a first form of an agent console,
          wherein the first form comprises a first chat portion and at least one application portion corresponding to at least one integrated enterprise system application;
       cause the agent device to display text related to a chat interaction between the agent device and a customer device within the first chat portion;
       fetch data related to the chat interaction from the at least one integrated enterprise system application;
       cause the agent device to display the data fetched from the at least one integrated enterprise system application within the at least one application portion;
       detect an input from the agent device seeking access to at least one non-integrated enterprise system application
       cause the agent console, responsive to detecting the input from the agent device, to toggle from the first form to a second form,
          wherein the second form of the agent console comprises a second chat portion, and
          the second form of the agent console is a widget form that hovers over the at least one non-integrated enterprise system application such that the second chat portion remains available on the agent device; and
       cause the agent device to display the second form of the agent console simultaneously with the at least one non-integrated enterprise system application on the agent device.

11. The system of claim 10, wherein the input from the agent device is a first input, and wherein the computer instructions, when executed by the at least one computer processor, cause the at least one computer processor to:

detect a second input from the agent device seeking access to the at least one integrated enterprise system application.

12. The system of claim 10, wherein the computer instructions, when executed by the at least one computer processor, cause the at least one computer processor to:
cause the agent console, responsive to detecting the second input from the agent device, to toggle from the second form to the first form.

13. The system of claim 10, wherein the computer instructions, when executed by the at least one computer processor, cause the at least one computer processor to:
integrate the at least one integrated enterprise system application within the agent console using at least one exposed application programming interface (API).

14. The system of claim 10, wherein the computer instructions, when executed by the at least one computer processor, cause the at least one computer processor to:
integrate the at least one integrated enterprise system application within the agent console as a web view within the agent device.

15. The system of claim 10, wherein the at least one integrated system application comprises at least one of a ticketing application to check a status of customer complaints, a customer relationship management (CRM) application to check customer records, a billing application to check recent transactions, or an ordering application to check a status of customer orders.

16. The system of claim 10, wherein the at least one non-integrated system application comprises at least one of a ticketing application to check a status of customer complaints, a customer relationship management (CRM) application to check customer records, a billing application to check recent transactions, or an ordering application to check a status of customer orders.

17. The system of claim 10, wherein the at least one application portion is dynamically populated with the data fetched from the at least one integrated enterprise system application.

18. A computer-readable non-transitory storage medium storing computer instructions that, when executed by at least one computer processor, cause the at least one computer processor to:
cause an agent device to display a first form of an agent console,
wherein the first form comprises a first chat portion and at least one application portion corresponding to at least one integrated enterprise system application;
cause the agent device to display text related to a chat interaction between the agent device and a customer device within the first chat portion;
fetch data related to the chat interaction from the at least one integrated enterprise system application;
cause the agent device to display the data fetched from the at least one integrated enterprise system application within the at least one application portion;
detect an input from the agent device seeking access to at least one non-integrated enterprise system application;
cause the agent console, responsive to detecting the input from the agent device, to toggle from the first form to a second form,
wherein the second form of the agent console comprises a second chat portion, and
the second form of the agent console is a widget form that hovers over the at least one non-integrated enterprise system application such that the second chat portion remains available on the agent device; and
cause the agent device to display the second form of the agent console simultaneously with the at least one non-integrated enterprise system application on the agent device.

* * * * *